(12) United States Patent
Smith et al.

(10) Patent No.: US 7,751,416 B2
(45) Date of Patent: Jul. 6, 2010

(54) VIRTUAL NETWORK DEVICE

(75) Inventors: Michael Smith, Morgan Hill, CA (US);
Ali Golshan, Palo Alto, CA (US);
Jeffrey Ym Wang, Saratoga, CA (US);
Neelima Mehta, Atlanta, GA (US);
Venkatesh Janakiraman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1056 days.

(21) Appl. No.: 10/666,306

(22) Filed: Sep. 18, 2003

(65) Prior Publication Data

US 2005/0063395 A1      Mar. 24, 2005

(51) Int. Cl.
*H04L 12/56*      (2006.01)

(52) U.S. Cl. .................. 370/410; 370/419; 709/208; 709/220; 709/227

(58) Field of Classification Search .................. None
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A | 10/1991 | Beach et al. | 370/85.6 |
| 5,371,852 A | 12/1994 | Attanasio et al. | 709/245 |
| 5,473,599 A | 12/1995 | Li et al. | |
| 5,822,512 A * | 10/1998 | Goodrum et al. | 714/13 |
| 5,825,772 A | 10/1998 | Dobbins et al. | 370/396 |
| 5,959,968 A | 9/1999 | Chin et al. | 370/216 |
| 5,959,972 A | 9/1999 | Hamami | 370/228 |
| 5,959,989 A | 9/1999 | Gleeson et al. | 370/390 |
| 5,978,852 A | 11/1999 | Myrick et al. | 709/238 |
| 6,032,194 A | 2/2000 | Gai et al. | 709/239 |
| 6,064,671 A | 5/2000 | Killian | 370/389 |
| 6,085,238 A | 7/2000 | Yuasa et al. | 709/223 |
| 6,108,300 A | 8/2000 | Coile et al. | 370/217 |
| 6,163,543 A | 12/2000 | Chin et al. | 370/400 |

(Continued)

FOREIGN PATENT DOCUMENTS

EP      1 035 685      9/2000      ............... 12/18

(Continued)

OTHER PUBLICATIONS

European Office Action from corresponding EPO Application No. 04 783 693.7 dated Dec. 15, 2006.

(Continued)

*Primary Examiner*—Daniel J. Ryman
*Assistant Examiner*—Brian Roberts
(74) *Attorney, Agent, or Firm*—Campbell Stephenson LLP (57) ABSTRACT

Method and devices are provided to form virtual switches for data networks. As noted above, the term "switch" as used herein will apply to switches, routers and similar network devices. Each virtual switch acts as a single logical unit, while encompassing at least two physical chassis. Accordingly, each virtual switch may be treated as a single point of management. Each virtual switch includes a master chassis and at least one slave chassis. The master chassis is configured to control the slave chassis. The master chassis includes at least one master supervisor card and the slave chassis includes at least one slave supervisor card. The master chassis and the slave chassis communicate via a virtual switch link according to a virtual switch link protocol.

27 Claims, 8 Drawing Sheets

U.S. PATENT DOCUMENTS

| | | | |
|---|---|---|---|
| 6,181,681 B1 | 1/2001 | Hiscock et al. | 370/279 |
| 6,181,699 B1 | 1/2001 | Crinion et al. | 370/392 |
| 6,195,351 B1 | 2/2001 | Hiscock et al. | 370/389 |
| 6,202,114 B1 | 3/2001 | Dutt et al. | 710/129 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,275,953 B1 | 8/2001 | Vahalia et al. | |
| 6,298,061 B1 | 10/2001 | Chin et al. | 370/400 |
| 6,377,992 B1 | 4/2002 | Fernandez et al. | |
| 6,388,995 B1 | 5/2002 | Gai et al. | 370/256 |
| 6,421,787 B1 | 7/2002 | Slaughter et al. | |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Gai et al. | 370/256 |
| 6,567,403 B1 | 5/2003 | Congdon et al. | 370/389 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | |
| 6,735,198 B1* | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,751,191 B1* | 6/2004 | Kanekar et al. | 370/217 |
| 6,760,776 B1 | 7/2004 | Gallo et al. | 709/238 |
| 6,804,721 B2 | 10/2004 | Wils et al. | 709/230 |
| 6,810,421 B1 | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,983,095 B2 | 8/2005 | Basturk et al. | 709/238 |
| 7,061,858 B1 | 6/2006 | Di Benedetto et al. | 370/219 |
| 7,061,875 B1 | 6/2006 | Portolani et al. | 370/256 |
| 7,127,633 B1 | 10/2006 | Olson et al. | 714/4 |
| 7,178,052 B2 | 2/2007 | Hebbar et al. | |
| 7,209,435 B1* | 4/2007 | Kuo et al. | 370/219 |
| 7,286,853 B2 | 10/2007 | Meier | 455/560 |
| 2001/0014097 A1 | 8/2001 | Beck et al. | 370/401 |
| 2002/0018489 A1 | 2/2002 | Ambe et al. | 370/475 |
| 2002/0080720 A1 | 6/2002 | Pegrum et al. | 370/236 |
| 2002/0089978 A1 | 7/2002 | Wang et al. | 370/389 |
| 2002/0091755 A1 | 7/2002 | Narin | 709/203 |
| 2002/0099972 A1* | 7/2002 | Walsh et al. | 714/10 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong | 370/539 |
| 2002/0184387 A1* | 12/2002 | Yamaya et al. | 709/238 |
| 2002/0186654 A1 | 12/2002 | Tornar | 370/225 |
| 2002/0188711 A1 | 12/2002 | Meyer et al. | 709/223 |
| 2003/0007489 A1 | 1/2003 | Krishnan et al. | 370/392 |
| 2003/0026248 A1 | 2/2003 | Hiroki | 370/352 |
| 2003/0037165 A1* | 2/2003 | Shinomiya | 709/238 |
| 2003/0061533 A1 | 3/2003 | Perloff et al. | 714/9 |
| 2003/0093557 A1* | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0208116 A1 | 10/2004 | Saint Etienne et al. | 370/216 |
| 2005/0036488 A1 | 2/2005 | Kalkunte et al. | 370/389 |
| 2005/0041665 A1 | 2/2005 | Weyman | 370/390 |
| 2005/0044186 A1 | 2/2005 | Petrisor | 709/219 |
| 2005/0063395 A1 | 3/2005 | Smith et al. | 370/399 |
| 2005/0111483 A1 | 5/2005 | Cripe et al. | 370/463 |
| 2005/0169311 A1 | 8/2005 | Millet et al. | 370/471 |
| 2005/0198371 A1 | 9/2005 | Smith et al. | 709/238 |
| 2005/0243826 A1 | 11/2005 | Smith et al. | 370/392 |
| 2005/0259646 A1 | 11/2005 | Smith et al. | 370/389 |
| 2005/0265346 A1 | 12/2005 | Ho et al. | |
| 2006/0015643 A1 | 1/2006 | Orava et al. | 709/238 |
| 2006/0215679 A1 | 9/2006 | Musoll et al. | 370/412 |
| 2007/0159971 A1 | 7/2007 | Zhang et al. | 370/230 |
| 2007/0180266 A1 | 8/2007 | Kang et al. | 713/189 |

FOREIGN PATENT DOCUMENTS

| | | | |
|---|---|---|---|
| EP | 1309135 | 5/2003 | |
| EP | 1 401 147 | 3/2004 | 12/26 |
| GB | 2 362 538 | 5/2000 | |
| WO | WO 00/72531 | 11/2000 | |
| WO | WO00/78004 | 12/2000 | |
| WO | WO 00/78004 | 12/2000 | |
| WO | WO 02/01413 | 5/2001 | |
| WO | WO 02/18965 | 3/2002 | 31/8 |
| WO | WO 03/081451 | 10/2003 | |

OTHER PUBLICATIONS

International Search Report, dated Aug. 2, 2005, from related International Application No. PCT/US2004/029554, including Notification of Transmittal, 6 pp.

Written Opinion of the International Searching Authority, dated Aug. 2, 2005, from related International Application No. PCT/US2004/029554, 5 pp.

International Search Report, dated Jan. 14, 2005, from corresponding International Application No. PCT/US2004/029553, including Notification of Transmittal, 4 pp.

Written Opinion of the International Searching Authority, dated Jan. 14, 2005, from corresponding International Application No. PCT/US2004/029553, 6 pp.

Knight S. et al., *Virtual Router Redundancy Protocol*, IETF, Apr. 1998, 27 pages.

CIPO "Examination Report" in related Canadian Patent Application No. 2,534,511 dated May 1, 2006 (4 pages).

USPTO "Notice of Allowance and fee(s) due" in related U.S. Appl. No. 10/666,887 dated Oct. 3, 2006 (10 pages).

D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification & 11 sheets of drawings.

News Release: "Cisco Raises the Bar in Stackable Switching, Introduces Catalyst 3750 Series with Cisco StackWise™ Technology;" 3 pages; http://newsroom.cisco.com/dlls/prod_041503b.html.

Cisco Catalyst 3750 Series Switches: "Cisco StackWise Technology White Paper:" 8 pages; http://www.cisco.com/en/US/products/hw/switches/ps5023/products_white_paper09186a00801b096a.shtml (Catalyst 3750 announced on Apr. 15, 2003, see AJ).

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Michael Ward; "802.1S Solves Architecture Issues:" *Network World*, Aug. 4, 2003; 3 pages; http://www.n_wfusion.com/cgi-bin/mailto/x.cgi.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

* cited by examiner

FIG. 1 (Prior Art)
CURRENT TYPICAL NETWORK TOPOLOGY

VIRTUAL NETWORK DEVICE

CROSS-REFERENCE TO RELATED APPLICATION

This application is related to U.S. Pat. No 7,178,052, issued Feb. 13, 2007, which application is hereby incorporated by reference for all purposes.

BACKGROUND OF THE INVENTION

1. Field of the Invention

The present invention relates to data networks. More particularly, the present invention relates to network topology.

2. Description of the Related Art

Figure 1:
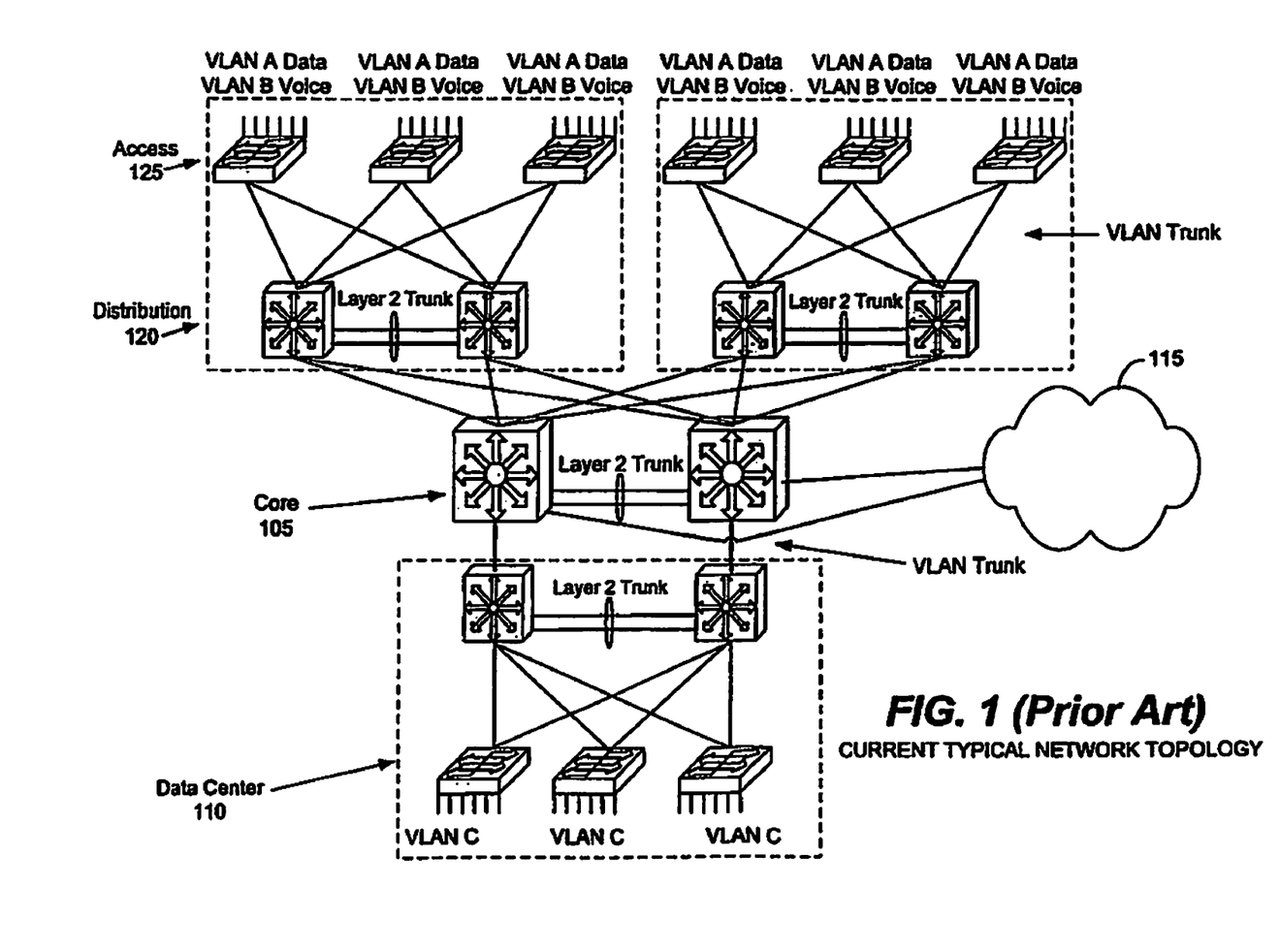
FIG. 1 is a network diagram illustrating a conventional network topology.

In most enterprise networks, a tiered network design is employed, with redundant network devices at various tiers. A typical network design is illustrated in FIG. 1. Core layer 105 may be connected to data center 110 and/or Internet 115. Core layer 105 generally includes 2 switches, each of which is connected with each device in distribution layer 120 for redundancy purposes. (As used herein the term "switch" will be used to mean an actual switch, a router, or any similar network device.) Similarly, each wiring closet in access layer 125 is normally connected to two devices of distribution layer 120.

Although this network topology has proven to be quite robust and reliable, it has some disadvantages. For example, each pair of redundant switches represents two points of management. This means that twice the time and effort is required for configuring layer 2 and layer 3 protocols, a spanning tree protocol, etc., as compared to what is required to configure a single device. Moreover, each wiring closet must be configured for uplinks to each of two redundant devices in the distribution layer.

It would be desirable to form networks that preserve the robust qualities of a conventional network topology, but which are simpler to manage.

SUMMARY OF THE INVENTION

Method and devices are provided to form virtual switches for data networks. As noted above, the term "switch" as used herein will apply to switches, routers and similar network devices. Each virtual switch acts as a single logical unit, while encompassing at least two physical chassis. Accordingly, each virtual switch may be treated as a single point of management. Each virtual switch includes a master chassis and at least one slave chassis. The master chassis is configured to control the slave chassis. The master chassis includes at least one master supervisor card and the slave chassis includes at least one slave supervisor card. The master chassis and the slave chassis communicate via a virtual switch link according to a virtual switch link protocol.

Some implementations of the invention provide a virtual switch for a distribution layer or a core layer of a network. The virtual switch includes a master chassis having a first plurality of linecards and a master supervisor card for controlling the first plurality of linecards. The virtual switch includes a slave chassis under the control of the master supervisor card, the slave chassis having a second plurality of linecards and a slave supervisor card. The virtual switch also includes a virtual switch link ("VSL") for communication between the master chassis and the slave chassis. The VSL may include a plurality of physical links combined to form a logical link.

The master chassis and the slave chassis may communicate according to a virtual switch link protocol for logically extending the data plane of the master chassis (the fabric, data bus, etc.) to that of the slave chassis.

In preferred embodiments, the VSL includes a control virtual switch link ("CVSL") and a data virtual switch link ("DVSL"). In some embodiments, the CVSL and the DVSL are on the same physical link. The CVSL can extend an internal Out-of-Band Channel ("OBC") for communication between the master chassis and the slave chassis. The DVSL can extend an internal chassis data plane for communication between the master chassis and the slave chassis. The master supervisor may communicate with the slave supervisor via inband messaging on the CVSL. The CVSL is preferably brought on-line first and may be used to determine which chassis will be the master chassis.

The VSL protocol preferably includes a field indicating whether a packet has traversed the virtual switch link. The OBC across the VSL may be used to synchronize routing tables of the master chassis and the slave chassis. The DVSL or the CVSL can be used to synchronize layer 2 tables. In some embodiments, a single physical link combines the control virtual switch link and the data virtual switch link. In alternative embodiments, the control virtual switch link and the data virtual switch link are formed from separate physical links.

Some embodiments of the inventions provide a master chassis configured to control a virtual switch for a distribution layer or a core layer of a network. The master chassis includes a first plurality of linecards and a master supervisor card for controlling the first plurality of linecards and a slave chassis. The master supervisor card communicates with the slave chassis via a VSL protocol that logically extends the data plane of the master chassis to that of the slave chassis.

Some aspects of the invention provide a method of forming a virtual switch from a plurality of physical switches in a distribution layer or a core layer of a network. The method includes the following steps: configuring a first physical switch as a master switch for controlling the virtual switch; configuring a second physical switch as a slave switch under the control of the master switch; forming a VSL for communication between the master switch and the slave switch; and causing the master switch and the slave switch to communicate via a VSL protocol.

The virtual switch link protocol may include a source port identifier, a destination port index, source flood information or VLAN information. The virtual switch link protocol may indicate whether an access control list or a QoS designation should be applied to a frame. The virtual switch link protocol may indicate whether a frame is a MAC notification frame and may include data plane priority information for a frame.

A first data plane of the master switch may be extended to include a second data plane of the slave switch according to communication between the master switch and the slave switch via the virtual switch link protocol. The virtual switch link may be formed from a plurality of physical links acting as a single logical link. The virtual switch link may be formed to include a data virtual switch link and a control virtual switch link. The data virtual switch link and the control virtual switch link may be formed on a single physical link.

The method may also include the steps of updating layer 2 forwarding tables in the master chassis and in the slave chassis, and correcting inconsistencies between the layer 2 forwarding tables in the master chassis and the slave chassis. The inconsistencies may be corrected according to frames transmitted on the data virtual switch link. The frames may be media access control ("MAC") notification frames. Some implementations of the invention provide a computer program embodied in a machine-readable medium. The computer program contains instructions for controlling a plurality of physical switches in a distribution layer or a core layer of a network to perform the following steps: configuring a first physical switch as a master switch for controlling the virtual switch; configuring a second physical switch as a slave switch under the control of the master switch; forming a VSL for communication between the master switch and the slave switch; and causing the master switch and the slave switch to communicate via a VSL protocol.

The computer program may include instructions for controlling a plurality of physical switches of a network to logically extend a data plane of the master switch to that of the slave switch.

Yet other implementations of the invention provide a method of initializing a virtual network device. The method includes the following steps: performing a handshake sequence between a first chassis and a second chassis, the first chassis and the second chassis being redundant network devices of a data network; and determining whether the first chassis or the second chassis will be a master chassis for controlling a virtual network device formed from the first chassis and the second chassis. The method may also include the step of forming a control virtual switch link of the virtual network device according to information exchanged during the handshake sequence.

The handshake sequence may include exchanging any of the following information: a hardware version of a supervisor; a chassis identifier; a chassis number; a software version of each supervisor in a chassis; hardware values for a slot in a chassis; or a slot/port of a remote endpoint for a particular link between the first chassis and the second chassis.

The method may include the step of ascertaining whether a physical link that will become a data virtual switch link is connected to both the first chassis and the second chassis. The method may also include the step of forming a data virtual switch link of the virtual network device if the ascertaining step indicated that the physical link was connected to both the first chassis and the second chassis.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Overview of the Virtual Switch

Within the virtual switch, there is only 1 Master Supervisor. The master supervisor provides the single management point to the user. The chassis containing the master supervisor is referred to as the master chassis. The other chassis forming the virtual switch are referred to as slave chassis. The active supervisor in the slave chassis will act as a subordinate of the master supervisor and will serve as a standby to the master supervisor in case of failure. If only 1 supervisor is present in the chassis, the entire chassis will be lost on failure but the virtual switch will continue as if those ports on the failed chassis were subject to an online insertion and removal ("OIR") event. All of the interfaces present on both of the chassis will appear to the user as 1 large switch. The port addressing is a single global space where each layer 2 ("L2") interface within the virtual switch has a unique port index.

The software image for the virtual switch should be configured on the master supervisor and downloaded to all of the other supervisors. This ensures that the entire virtual switch will always run the same software image version.

Exemplary Embodiments of the Virtual Switch

Figure 2A:
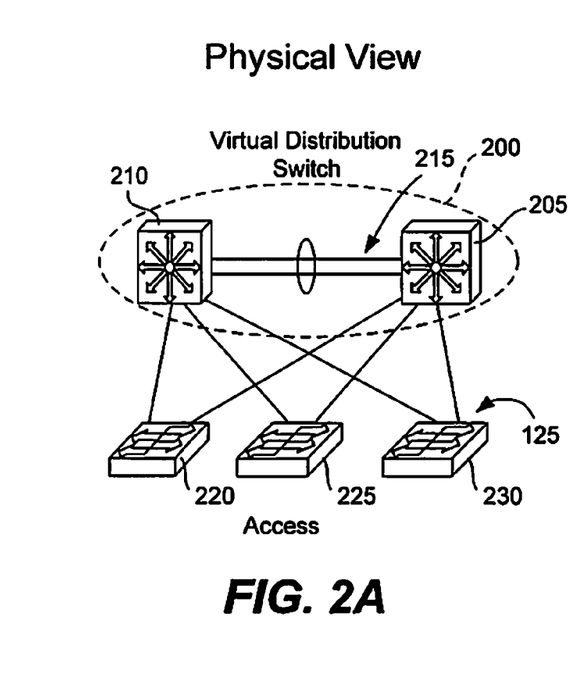
FIGS. 2A and 2B provide a simplified illustration of forming a virtual switch.

FIG. 2A is a network diagram that depicts a high-level physical view of virtual switch 200 according to some embodiments of the invention. In this embodiment, virtual switch 200 includes distribution layer switches 205 and 210, which are in communication via virtual switch link 215. In some preferred embodiments, virtual switch link 215 is a plurality of physical links combined to form a logical link. According to some such embodiments, virtual switch link 215 is an Etherchannel port bundle that is run according to a proprietary virtual switch link protocol. Access layer devices 220, 225 and 230 are physically connected to each of distribution layer switches 205 and 210.

Figure 2B:
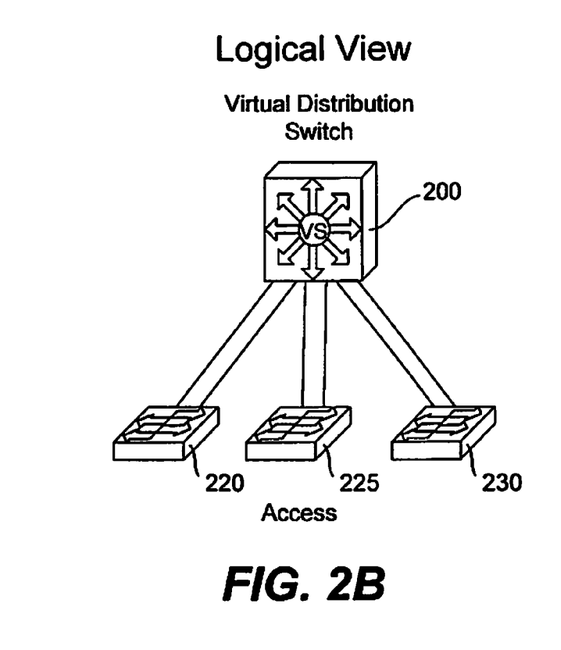

FIG. 2B depicts a logical view of virtual switch 200. Access layer devices 220, 225 and 230, though physically connected to each of distribution layer switches 205 and 210, interact with virtual switch 200 as if it were a single network device. All devices external to virtual switch 200 view it as a single network device. At layer 3, virtual switch 200 acts as a single router to access layer 125 and core layer 105. Similarly, at layer 2, virtual switch 200 acts as a single switch to access layer 125 and core layer 105. The two configuration points of distribution layer switches 205 and 210 may be treated as a single configuration point.

Although virtual switch 200 is formed at the distribution layer in the foregoing example, virtual switch 200 may be formed in other parts of a network, e.g., at the core layer. Moreover, according to some embodiments, a virtual switch 200 formed at the distribution layer also includes devices in access layer 125. According to some such embodiments, the access layer devices that are in communication with virtual switch 200 do not make independent forwarding decisions (regarding access control lists ("ACLs), quality of service ("QoS"), etc.). In such embodiments, the access layer devices act as remote dumb linecards (sometimes referred to herein as "satellites") to the devices in the distribution layer. Accordingly, virtual switch 200 can include both devices in the distribution layer and devices in the access layer. Such embodiments of virtual switch 200 create a single point of management for both the access and distribution layers.

Figure 2C:
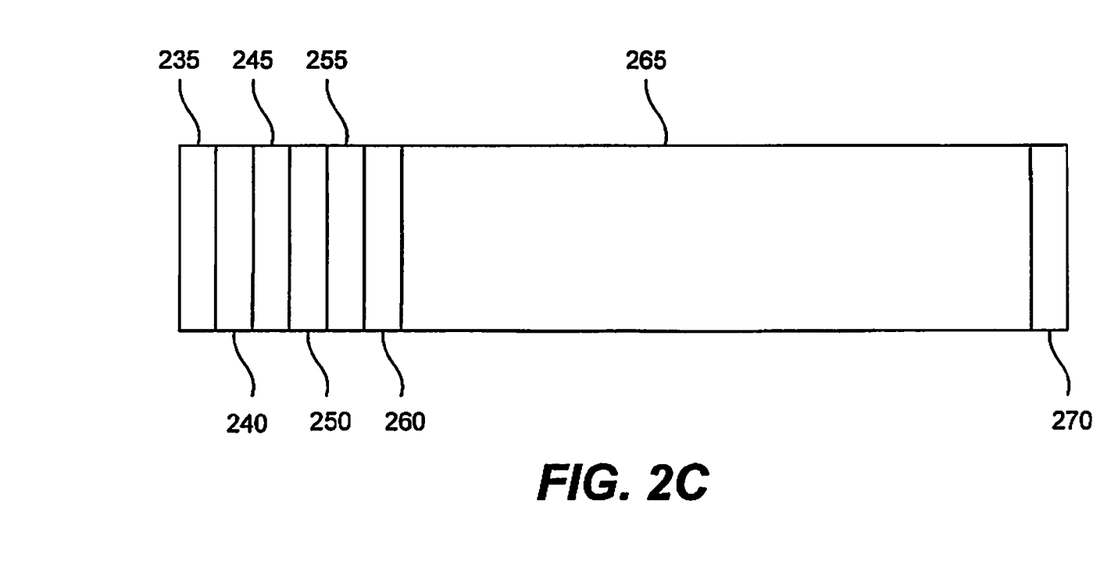
FIG. 2C is a block diagram illustrating a simplified version of a frame sent between an access layer device to a distribution layer device according to some implementations.

FIG. 2C illustrates an exemplary format of a frame used for communication between satellites and the devices in the distribution layer. As used herein, the terms "packet" and "frame" have the same meaning. The sizes of each field do not necessarily correspond with the number of bytes in each field. The field types shown and described are purely illustrative. Moreover, each field may contain one or more subfields, some of which may be reserved.

Field 235 includes destination information that may indicate, for example, a destination index for use by port index tables, whether flooding has been enabled, VLAN information, etc. Field 240 includes source information such as a source index for use by port index tables. Field 245 includes status, control and frame type information. Field 250 includes service class and service type information. Field 255 may include such information as bundle hashing information and forwarding information.

Field 260 includes control information of various kinds. Field 260 may include, for example, information regarding whether input or output QoS or ACLs should be applied to the frame. Some subfields of field 260 are preferably reserved. Field 265 includes the payload and field 270 is a CRC field.

The satellite switches address the management of the wiring closet by providing a simple switch with no local forwarding capability. All of the forwarding intelligence is provided by the upstream switch. The satellite requires uplink connections to 2 upstream switches for redundancy purposes.

Without the virtual switch, some of the satellite ports need to be assigned to 1 distribution switch and some to the other. If these are 2 distribution switches are independent, the configuration can be different and syncing the configuration for the satellite ports and not for the local ports introduces a great deal of complexity. Additionally, global configuration on the 2 switches can be different so syncing would cause problems for local ports and not syncing global information would cause problems for the satellite ports on switchover. The virtual switch model allows the wiring closet satellites to connect to 1 virtual switch. Since there is one configuration for the entire virtual switch, all of the problems encountered with connecting to multiple distribution switches are solved.

The Virtual Switch Link

An important feature of the virtual switch is the virtual switch link ("VSL"). The VSL is a point-to-point connection between at least 2 chassis that are part of the same virtual switch. Packets traversing the VSL provide additional information, e.g., in the form of a prepended header. One of the most important pieces of information that is passed in the VSL is the source port index. This allows the forwarding engine on the peer chassis to learn the original ingress port. It also indicates to the master supervisor the ingress physical port on the slave chassis when packets are punted to the software.

In preferred implementations, packets sourced from the VSL do not contain the VSL port index. Therefore, additional hardware mechanisms are needed for such implementations, to ensure that packets do not loop across the multiple physical links composing the VSL. In some such implementations, the port ASIC of each ingress VSL port will tag the packet header with a VSL bit. On each egress VSL port, the port ASIC examines the packet header and if the VSL bit is set, the packet is not retransmitted out of the VSL.

The VSL is not only used for data traffic but also internal control traffic as well. Packets that normally would not be transmitted outside a chassis are permitted out of the VSL, in order to enable the master chassis and the slave chassis to form a single virtual switch. Communication between the master supervisor CPU and the CPUs present on the slave chassis occurs inband through the VSL. Packets are sent according to a VSL protocol. An exemplary VSL protocol will be described below with reference to FIG. 6.

Software images are distributed from the master supervisor to the slave chassis through this inband communication. Additional information such as OIR events and port events such as link up/down are also propagated via this inband mechanism. Normally, mechanisms (i.e., a Don't Forward bit in the header) are in place to ensure such information would not be propagated outside the chassis. On the VSL, these mechanisms are disabled (i.e., packets with a Don't Forward bit set are allowed out on the VSL).

Preferably, layer 3 ("L3") forwarding tables are populated via inband CPU communication from the master supervisor. L2 forwarding tables are preferably populated through hardware learning. Flooded packets will be flooded to all ports belonging to the VLAN within the virtual switch. Multicast packets will be sent to all ports that have joined the group, regardless of the chassis in which the port resides.

Since learning is done through distributed hardware, the distributed forwarding engines (FEs) require correction of the L2 forwarding tables when they get out of sync. This is done in the form of the MAC Notification frame, which is transmitted from the egress FE to the ingress FE. With the introduction of the VSL, the MAC Notification is extended outside of the chassis. It is permitted only on the VSL links. In some implementations, the size of the frame has been extended to 64 bytes to comply with minimum Ethernet standard size. Normally, a MAC Notification is only generated by the egress FE. In the virtual switch, a MAC Notification can also be generated on the ingress FE lookup if the ingress port is part of the VSL. The MAC Notification allows hardware learning throughout the virtual switch.

The VSL carries the control and data traffic between the 2 chassis. It acts to extend the internal data plane (fabric, data bus, etc.) between the peer chassis for data traffic and extends the internal OBC for the purposes of control traffic (i.e. IPC, SCP traffic). In some preferred implementations of the invention, the VSL is separated into the control VSL ("CVSL") and the data VSL ("DVSL"). The CVSL and the DVSL may be separate physical links or may be combined on the same physical link(s).

By their very nature of design and implementation, the majority of routing protocols are designed to operate within a single CPU. Within a virtual switch, there can be multiple supervisor cards present. Amongst the multiple supervisors, one will be chosen to run all of the routing protocols for the entire VS.

L3 and L2 control packets (i.e. OSPF LSAs, Spanning Tree BPDUs, etc.) which need to be transmitted out of the slave chassis local ports will be transmitted to the slave chassis via the data virtual switch link ("DVSL"), described in detail below. All control communication to the slave chassis will be transmitted to the slave chassis via the control virtual switch Link ("CVSL"). Along with the L2 and L3 control protocols, the software datapath can be run in a centralized manner on the master active supervisor. In alternative embodiments, the software datapath can be run in a distributed fashion.

According to some preferred implementations, the internal Out-of-Band Channel (OBC) is used for control software communication between cards within a chassis. In such implementations, the CVSL is used to extend the internal OBC to the remote chassis. The DVSL is used to extend the internal chassis data plane to the remote chassis.

The CVSL is used for CPU-to-CPU communication. In addition, it is used to communicate with the peer chassis to determine its mastership role. The mastership role of the chassis drastically affects the behavior of the software. As a result, the mastership role should be determined very early in the chassis boot-up and before the majority of software applications begin running. To avoid initializing any linecards and to shorten the boot time, the CVSL should be limited to the ports physically residing on the supervisor cards.

The CVSL is used before mastership has been determined. This infers that since the master is unknown, the proper configuration file to use for boot-up is unknown. Because the correct configuration file is unknown, the CVSL ports should be well-known ports. Thus, the first 2 uplinks of each supervisor card are preferably used as the control VSL. The ports on the local standby supervisor will be accessible to the local active supervisor when 2 supervisors are present in the chassis.

The master chassis supervisor will communicate with its peer on the slave chassis via inband messaging. This inband messaging is sent across the CVSL. The inband messaging can be directed to either the slave chassis supervisor or to the linecards on the slave chassis.

When the message is being sent to the linecard on the slave chassis, it will be proxied by the slave supervisor. The slave supervisor will send the message via the OBC to the linecard on behalf of the master chassis supervisor.

Internally, the CVSL is preferably implemented as a port bundle and will be resilient to failures of a single link in a fully meshed system. However, only 1 link is required because the hash algorithm will preferably be based upon the source and destination MAC address, which will always be the same for the inband CPU communication.

Communication to the linecards of the remote chassis will be sent via the CVSL and terminated by the active supervisor on the remote chassis. This supervisor will then send the message to the linecard via OBC and proxy the response back to the original chassis.

In some embodiments, each chassis can have 1 or 2 supervisors. Because only 1 CVSL physical link is mandatory, this leads to multiple hardware deployment scenarios for the CVSL.

Figure 3:
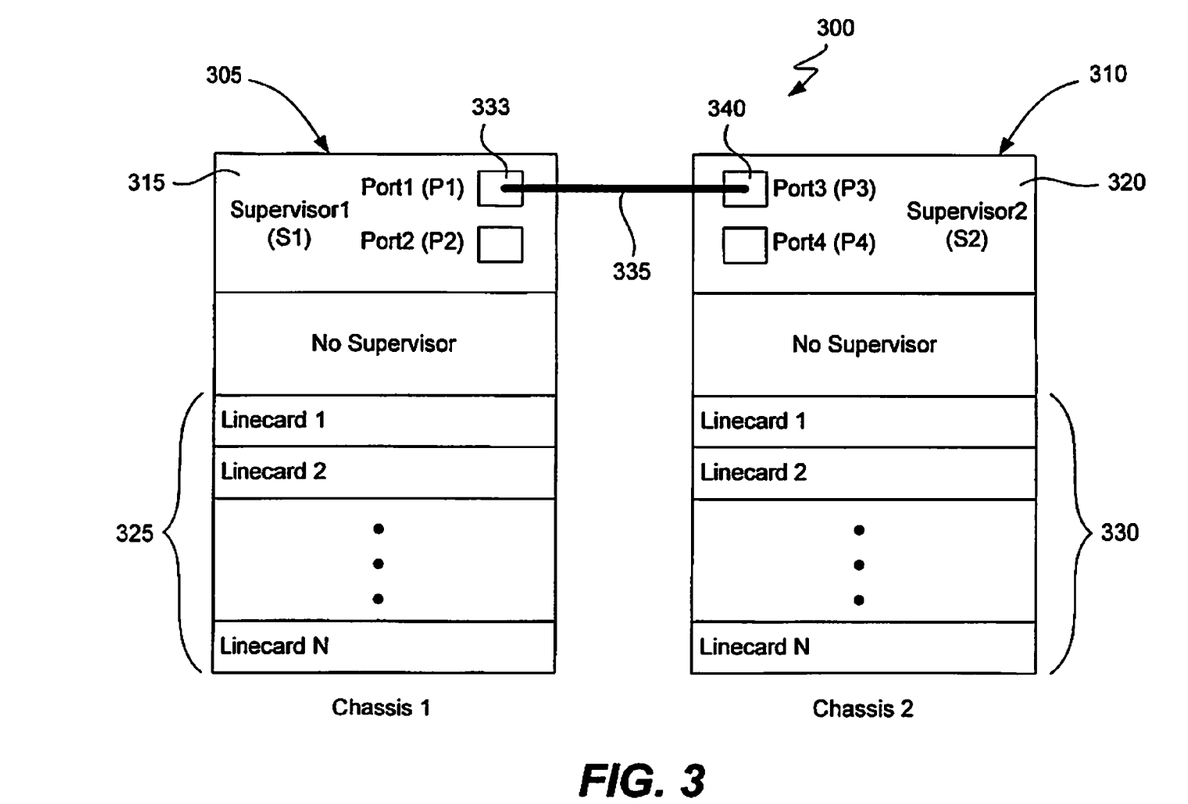
FIG. 3 illustrates a minimal connection configuration for a virtual switch.

A minimal hardware deployment scenario is illustrated in FIG. 3. In scenario 300, master chassis 305 has a single supervisor 315 and a plurality of linecards 325. Similarly, slave chassis 310 has a single supervisor 320 and a plurality of linecards 330. Link 335 is formed between port 333 of supervisor 315 and port 340 of supervisor 320. In this embodiment, link 335 combines a CVSL and a data virtual switch link ("DVSL") in one physical link. Exemplary attributes of a DVSL will be described below.

The principal advantages of scenario 300 are minimal cost and minimal configuration time. The disadvantages include a lack of redundancy, in that the failure of any component creates an outage. Accordingly, scenario 300 is not as robust as other configurations of virtual switches according to the present invention.

Figure 4:
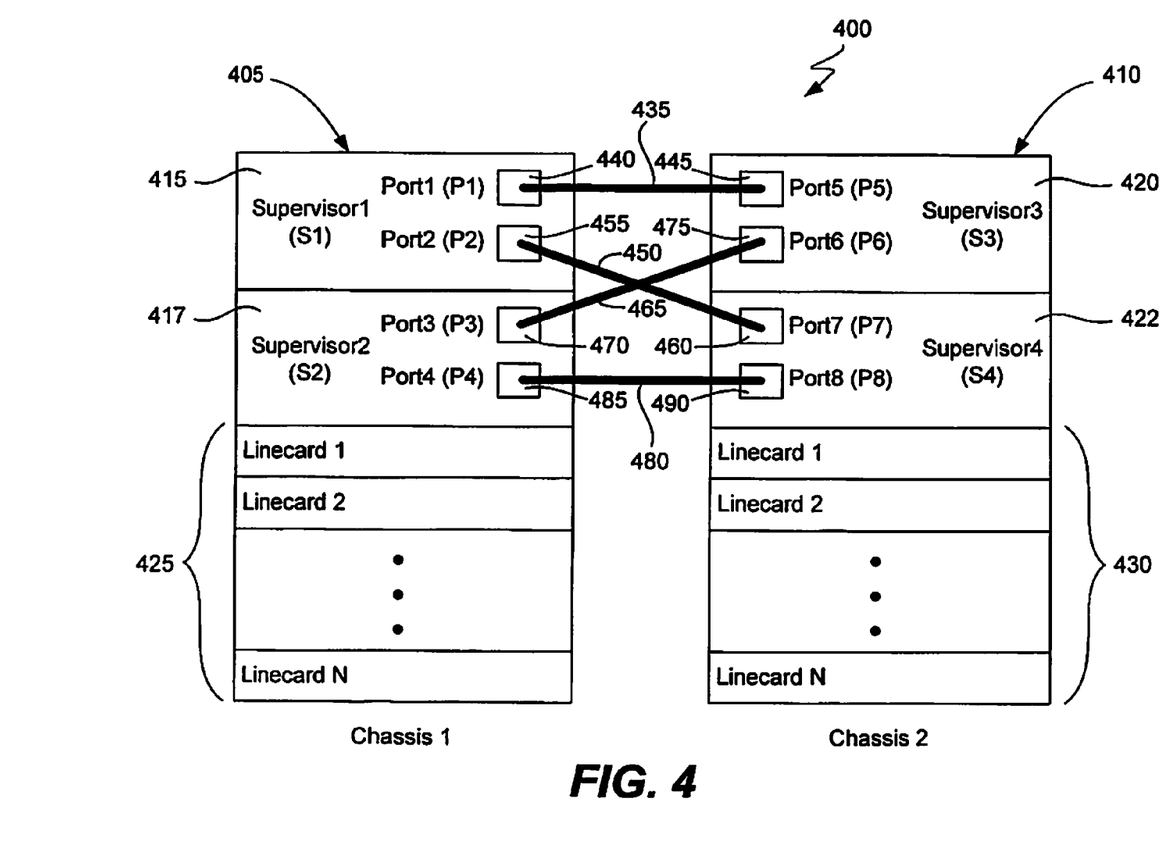
FIG. 4 illustrates a more robust connection configuration for a virtual switch.

A more robust deployment scenario 400 is illustrated in FIG. 4. Master chassis 405 includes master supervisor 415, stand-by supervisor 417 and linecards 425. Slave chassis 410 includes slave supervisor 420, stand-by slave supervisor 422 and linecards 430.

In this scenario, both chassis contain 2 supervisors and there are 4 physical links between the supervisors: link 435 connects ports 440 and 445; link 450 connects ports 455 and 460; link 465 connects ports 470 and 475; and link 480 connects ports 485 and 490.

Deployment scenario 400 has the advantage of much greater redundancy than deployment scenario 300. Having supervisor redundancy on both chassis, with a physical link between each of the 4 supervisors, creates a much more robust physical link scenario: deployment scenario 400 allows the virtual switch to operate even after a number of 3-failure scenarios. The disadvantages of deployment scenario 400 include higher cost and greater configuration time.

Control VSL Initialization

Before the virtual switch can become active, the CVSL must be brought online. According to one preferred embodiment, the following items are passed as part of the initial handshake sequence: the hardware version of the supervisor; a chassis identifier (e.g., the MAC address from the chassis backplane); a chassis number; the software version of each supervisor in the chassis; hardware (e.g., EEPROM) values for every slot in the chassis; and the slot/port of the remote endpoint for the particular CVSL link.

Most of the above items are used to determine mastership. The 2 items affecting the CVSL directly are the chassis identifier and the slot/port of the remote endpoint for the particular CVSL link.

Slot/Port

The slot/port is used to determine which of the many possible CVSL hardware deployment scenarios is in use. In preferred implementations, this information is also used to generate warnings if necessary.

Chassis Identifier

The chassis identifier is used to determine if all of the CVSL links are connected to the same chassis. If this configuration error does occur, the chassis will preferably choose one of the peer chassis with which to form a virtual switch. Preferably, it will then administratively shutdown all of the CVSL links not connecting to the chosen peer chassis. The initialization sequence will preferably negotiate the chosen peer chassis across the remaining CVSL to avoid situations where no virtual switch is formed when there are multiple misconfigurations.

The initialization handshake across the CVSL utilizes a well-known destination MAC address. This allows packets to be redirected to the CPU and ensures that the initialization handshake packets are not treated as data packets and forwarded outside of the virtual switch. The initialization handshake packet is redirected to the master supervisor, if available, or to the local supervisor, either of which can determine the error scenario based on the source port index. Upon detection of the configuration error, a warning is preferably issued to the user and both sides of the link are administratively shutdown. The initial handshake sequence will preferably be retriggered upon a link up/down event.

Data VSL

After the CVSL is brought online, mastership is determined, and the virtual switch is formed, the Data VSL (DVSL) must be brought online. The DVSL is an extension of the internal data plane and used for packet forwarding between the chassis of the virtual switch. The CVSL is preferably not used for any user data traffic.

Figure 5:
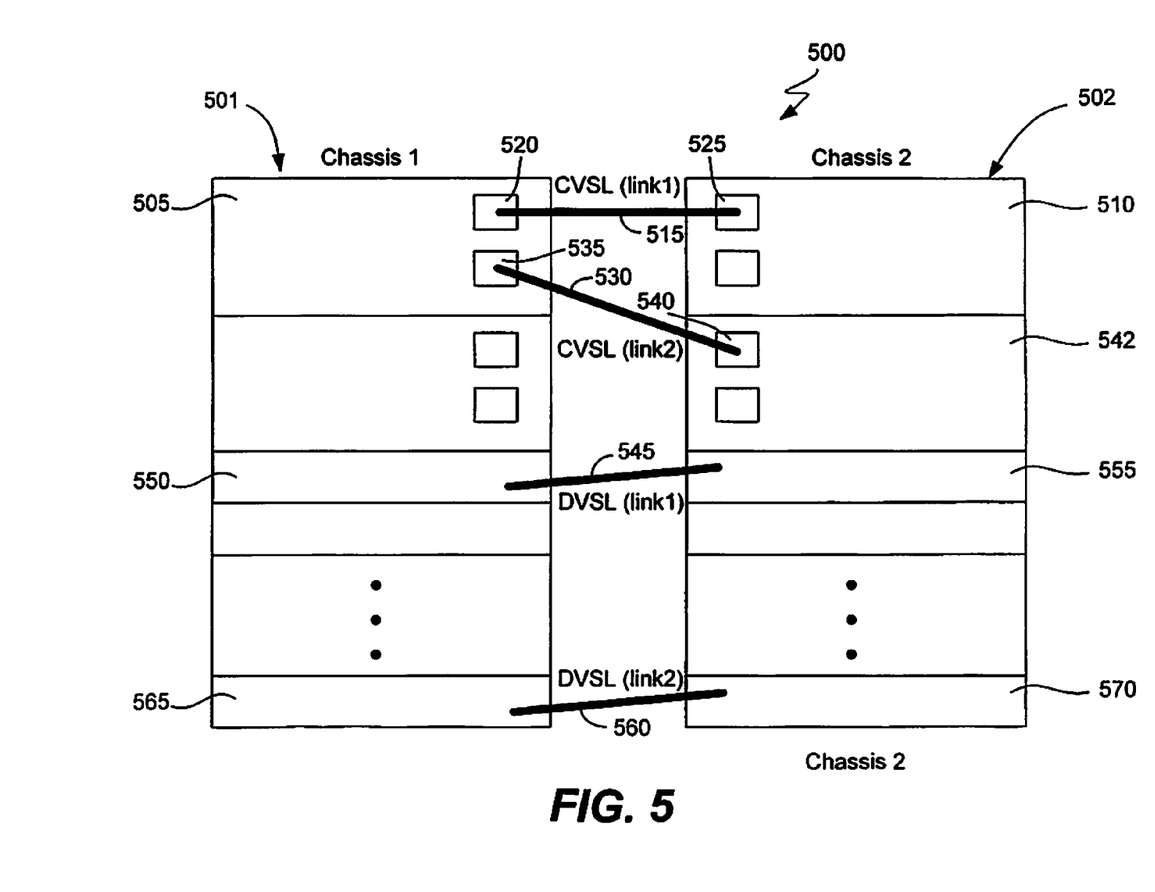
FIG. 5 illustrates exemplary data virtual switch links and a moderately robust connection configuration for a virtual switch.

One exemplary configuration of both a CVSL and a DVSL is shown in FIG. 5. CVSL link 515 connects port 520 of master supervisor 505 in master chassis 501 with port 525 of slave supervisor 510 in slave chassis 502. CVSL link 530 connects port 535 of master supervisor 505 in master chassis 501 with port 540 of standby slave supervisor 542 in slave chassis 502. DVSL link 545 connects linecard 550 of master chassis 501 with linecard 555 of slave chassis 502. Similarly, DVSL link 560 connects linecard 565 of master chassis 501 with linecard 570 of slave chassis 502.

Data Traffic Usage of DVSL

According to some preferred implementations of the invention, a packet arriving from a non-DVSL port will be transmitted out of a DVSL port in the following circumstances: (1) the packet is flooded on the VLAN and there exist one or more ports on the peer chassis carrying that particular VLAN; (2) the packet is destined for a multicast group where members have joined on one or more ports on the peer chassis; (3) the packet is destined for a MAC address which has been learned on a port of the peer chassis; or (4) the packet is a MAC Notification frame destined for a port that is on the peer chassis.

Packets are sent across the VSL in cases 1, 2, and 3 since it is the only way to reach the egress ports. Packets are sent across the VSL in case 4 since they are internal control packets destined to the peer chassis EARL. Note that a given packet may be sent across the VSL for case 1.

All packets traversing the DVSL will be encapsulated with an inband header. In preferred implementations, this header will be appended to the packet by the egress port (e.g., by an ASIC of the egress port) and stripped off on the other side of the DVSL by the ingress port. The inband header carries information such as the ingress port index, destination port(s) index, VLAN, CoS, etc.

Figure 6:
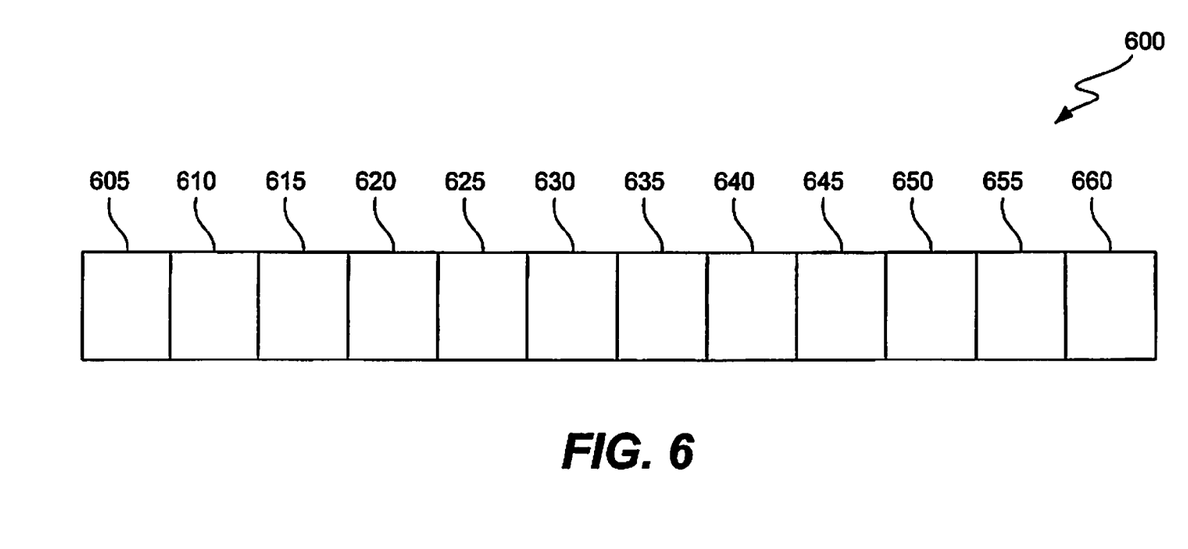
FIG. 6 is a block diagram illustrating a simplified version of a frame header according to one implementation of a virtual switch link protocol.

One exemplary header format is depicted in FIG. 6. The sizes of each field do not necessarily correspond with the number of bytes in each field. The field types shown and described are purely illustrative. Moreover, each field may contain one or more subfields, some of which may be reserved. Here, field 605 includes class of service information and field 610 indicates the type of frame (e.g., Ethernet, ATM, etc.). Field 615 includes control information such as whether port index tables should be updated and whether a port is "trusted." Field 620 includes source VLAN information and indicates whether input or output ACLs or QoS should be applied to this frame.

Field 625 includes source information such as source index, source flood information, etc. Field 630 is a frame length field. Field 635 is a status field that includes information regarding e.g., the type of encapsulation and whether the CRC was correctly received. Field 640 includes layer 3 information that a receiving port extracts from the frame. Field 645 indicates, among other things, whether the frame is a MAC notification frame. Field 650 includes fabric priority bits and port-of-exit bits. Field 655 includes destination information, such as destination index and destination flood information. The information in field 655 may be provided by address forwarding logic. Field 660 is a CRC field.

MAC Notification Usage of the DVSL

In addition to the typical network traffic, the DVSL is used to transport the MAC Notification (MN) frames used in some preferred implementations. MAC address table management will preferably occur on each chassis independently. The configuration of items such as static MAC entries will be provided from the master chassis as part of the configuration synchronization.

The majority of MAC address table management is preferably done in hardware, such as learning of dynamic MAC entries. Due to the distributed nature of the forwarding mechanisms of some network devices, (e.g., of the L2 forwarding of Cisco's Catalyst 6000™), there is internal communication between ASICs for the MAC address table management. A MAC Notification (MN) frame is used to correct any inconsistencies found in the L2 tables.

The DVSL is configured by the user and can be on any linecard that supports the inband header. Although the DVSL can operate with only a single physical link, it is recommended that the DVSL is implemented as a number of physical links combined to form 1 logical link, e.g., as a multi-module Etherchannel.

The DVSL may be configured via an interface level configuration command. In some implementations, this command can only be configured on an Etherchannel interface.

According to some such implementations, up to 2 Etherchannel interfaces can be configured as a VSL. The 2 configured Etherchannel interfaces are for each end of the VSL. When the command is entered, the Etherchannel member ports should be examined to ensure that they are all part of the same physical chassis. If they are not, a warning should be issued and the command should be rejected. The DVSL should only be configured when the CVSL is up, because it requires both ends of the DVSL to be configured on the master active supervisor.

The DVSL initialization sequence should not begin until there are 2 Etherchannels configured as the DVSL within the virtual switch. Each Etherchannel represents one end of the DVSL. Until there are 2 DVSL endpoints configured, the first DVSL configured will preferably remain in an administratively shutdown state. This will help to make certain that the initialization handshake packets are not sent and interpreted as data packets during the transitory configuration from normal Etherchannel to DVSL.

DVSL Initialization

The DVSL initialization sequence is preferably a subset of the CVSL initialization sequence. In preferred implementations, the initialization handshake uses a well-known destination MAC address to ensure that, even in misconfigurations, the handshake packet will be sent to the local CPU and not switched outside of the virtual switch. During the initialization handshake sequence, all packets are redirected to the master supervisor CPU. On the slave chassis, this is done via the CVSL. This is highly rate-limited and proxied through the local active supervisor in the peer chassis. The purpose of the DVSL initialization handshake is mainly to check for various DVSL-specific configuration errors.

The majority of configuration errors have already been checked through the CVSL initialization handshake. The DVSL initialization handshake exchanges the chassis identifier to ensure that all of the DVSL links are connected between the same 2 chassis. Normal data traffic will traverse the DVSL until the initialization handshake has completed successfully. If the link goes down for any reason, the initialization handshake sequence will begin again and data traffic will not traverse the link until the handshake is completed.

Figure 7:
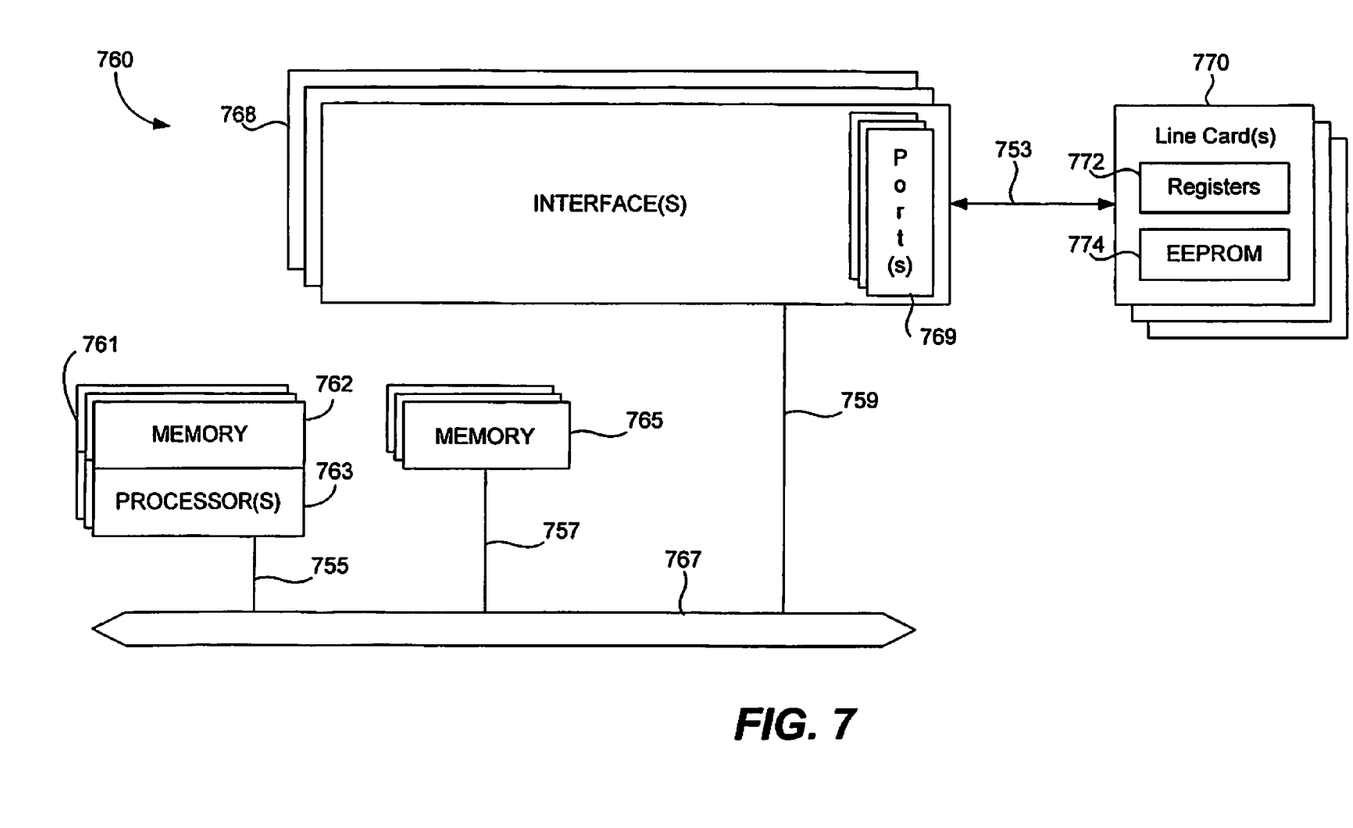
FIG. 7 illustrates a simplified version of a network device that may be configured to implement some methods of the present invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "linecards"). Generally, interfaces 768 control the sending and receiving of data packets over the network and sometimes support other peripherals used with the network device 760. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g., Windows NT), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 7) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application. For example, although the virtual switches of the present invention have been mainly described in terms of the distribution layer of a network, they are equally applicable to the core layer and the data center.

Accordingly, the present embodiments are to be considered as illustrative and not restrictive, and the invention is not to be limited to the details given herein, but may be modified within the scope and equivalents of the appended claims.

We claim:

1. A virtual switch, the virtual switch comprising:
a master distribution switch chassis comprising:
a first plurality of linecards;
a master supervisor card for controlling the first plurality of linecards;
a first master distribution switch port configured for communication with a slave distribution switch chassis over a virtual switch link, wherein the master distribution switch chassis and the slave distribution switch chassis communicate one or more media access control (MAC) notification frames according to a virtual switch link protocol over the virtual switch link;
a second master distribution switch port configured to communicate with a first satellite switch; and
a third master distribution switch port configured to communicate with core switches; and
a slave distribution switch chassis, coupled to the master distribution switch chassis by the virtual switch link and under the control of the master supervisor card, the slave distribution switch chassis comprising:
a second plurality of linecards;
a slave supervisor card;
a first slave distribution switch port configured for communication with the master distribution switch chassis over the virtual switch link;
a second slave distribution switch port configured to communicate with a second satellite switch; and
a third slave distribution switch port configured to communicate with the core switches.

2. The virtual switch of claim 1, wherein the virtual switch link comprises a control virtual switch link and a data virtual switch link.

3. The virtual switch of claim 2, wherein the control virtual switch link extends an internal Out-of-Band Channel to communicate between the master distribution switch chassis and the slave distribution switch chassis.

4. The virtual switch of claim 2, wherein the data virtual switch link extends an internal chassis data plane to communication between the master distribution switch chassis and the slave distribution switch chassis.

5. The virtual switch of claim 2, wherein the master supervisor communicates with the slave supervisor via inband messaging on the control virtual switch link.

6. The virtual switch of claim 2, wherein the control virtual switch link is brought on-line first and is used to determine which chassis will be the master distribution switch chassis.

7. The virtual switch of claim 2, wherein a single physical link combines the control virtual switch link and the data virtual switch link.

8. The virtual switch of claim 2, wherein the control virtual switch link and the data virtual switch link are formed from separate physical links.

9. The virtual switch of claim 1, wherein the virtual switch link comprises a plurality of physical links combined to form a logical link.

10. The virtual switch of claim 1, wherein a packet header according to the virtual switch link protocol comprises a field indicating whether a packet has traversed the virtual switch link.

11. The virtual switch of claim 1, wherein the virtual switch link is used to synchronize routing tables of the master distribution switch chassis and the slave distribution switch chassis.

12. A method of forming a virtual switch from a plurality of physical switches in a network, the method comprising:
   configuring a first physical switch as a master switch for controlling the virtual switch;
   configuring a second physical switch as a slave switch under the control of the master switch, wherein the first physical switch and the second physical switch are redundant backups acting as distribution switches in a network;
   forming a virtual switch link for communication between the master switch and the slave switch;
   causing the master switch and the slave switch to communicate via a virtual switch link protocol;
   communicating a media access control (MAC) notification frame between the master switch and the slave switch via the virtual switch link according to the virtual switch link protocol; and
   causing the master switch and the slave switch to act as a single virtual switch when interacting with an access layer satellite switch coupled to both the master switch and the slave switch, wherein the virtual switch is configured to include a destination port.

13. The method of claim 12, wherein a packet header according to the virtual switch link protocol comprises a source port identifier.

14. The method of claim 12, wherein a packet header according to the virtual switch link protocol comprises a destination port index.

15. The method of claim 12, wherein a packet header according to the virtual switch link protocol comprises source flood information.

16. The method of claim 12, wherein a packet header according to the virtual switch link protocol comprises virtual local area network (VLAN) information.

17. The method of claim 12, wherein the virtual switch link protocol is used by the first and second physical switches to indicate whether an access control list should be applied to a frame.

18. The method of claim 12, wherein the virtual switch link protocol is used by the first and second physical switches to indicate whether a quality of service (QoS) designation should be applied to a frame.

19. The method of claim 12, wherein the virtual switch link protocol is used by the first and second physical switches to indicate whether a frame is the MAC notification frame.

20. The method of claim 12, wherein a packet header according to the virtual switch link protocol comprises data plane priority information for a frame.

21. The method of claim 12, further comprising forming the virtual switch link from a plurality of physical links acting as a single logical link.

22. The method of claim 12, further comprising forming the virtual switch link to include a data virtual switch link and a physically separate control virtual switch link.

23. The method of claim 22, further comprising:
   updating layer 2 forwarding tables in the master switch;
   updating layer 2 forwarding tables in the slave switch; and
   correcting inconsistencies between the layer 2 forwarding tables in the master switch and the layer 2 forwarding tables in the slave switch according to frames transmitted on the data virtual switch link.

24. The method of claim 12, further comprising:
   updating layer 2 forwarding tables in the master chassis;
   updating layer 2 forwarding tables in the slave switch; and
   correcting inconsistencies between the layer 2 forwarding tables in the master switch and the layer 2 forwarding tables in the slave switch.

25. The method of claim 12 wherein the step of forming the virtual switch link comprises combining a data virtual switch link and a control virtual switch link on a single physical link.

26. An apparatus for forming a virtual switch from a plurality of physical switches in a distribution layer or a core layer of a network, the apparatus comprising:
   means for configuring a first physical switch as a master switch for controlling the virtual switch;
   means for configuring a second physical switch as a slave switch under the control of the master switch, wherein the first physical switch and the second physical switch are redundant backups acting as distribution switches in the network;
   means for forming a virtual switch link for communication between the master switch and the slave switch;
   means for causing the master switch and the slave switch to communicate one or more media access control (MAC) notification frames according to a virtual switch link protocol over the virtual switch link; and
   means for causing the master switch and the slave switch to act as a single virtual switch when interacting with an access layer satellite switch.

27. A computer program embodied in a machine-readable medium, the computer program containing instructions for controlling a plurality of physical switches of a network to perform the following steps:
   configuring a first physical switch as a master switch for controlling a virtual switch;
   configuring a second physical switch as a slave switch under the control of the master switch, wherein the first physical switch and the second physical switch are redundant backups acting as distribution switches in the network;
   forming a virtual switch link for communication between the master switch and the slave switch;
   causing the master switch and the slave switch to communicate via a virtual switch link protocol;
   communicating a media access control (MAC) notification frame between the master switch and the slave switch via the virtual switch link according to the virtual switch link protocol; and
   causing the master switch and the slave switch to act as a single virtual switch when interacting with an access layer satellite switch.

* * * * *